US012668119B2

(12) United States Patent
Ishizaka et al.

(10) Patent No.: US 12,668,119 B2
(45) Date of Patent: Jun. 30, 2026

(54) STRUCTURE FOR PREVENTING INTRUSION OF RAINWATER INTO ENGINE ROOM AND WORKING VEHICLE

(71) Applicant: TAKEUCHI MFG. CO., LTD., Hanishina-gun (JP)

(72) Inventors: Satoshi Ishizaka, Nagano (JP); Yohei Hayashi, Nagano (JP); Shingo Takeuchi, Nagano (JP); Naoyuki Matsui, Kanagawa (JP)

(73) Assignee: TAKEUCHI MFG. CO., LTD. (JP)

( * ) Notice: Subject to any disclaimer, the term of this patent is extended or adjusted under 35 U.S.C. 154(b) by 300 days.

(21) Appl. No.: 18/644,311

(22) Filed: Apr. 24, 2024

(65) Prior Publication Data

US 2025/0058623 A1 Feb. 20, 2025

(30) Foreign Application Priority Data

Aug. 17, 2023 (JP) ................................. 2023-133028

(51) Int. Cl.
B60K 11/08 (2006.01)
B60K 13/02 (2006.01)
(Continued)

(52) U.S. Cl.
CPC .............. B60K 11/08 (2013.01); B60K 13/02 (2013.01); E02F 9/0891 (2013.01); E02F 3/3414 (2013.01)

(58) Field of Classification Search
CPC ....... B60K 11/08; B60K 13/02; E02F 9/0891; E02F 3/3414; B62D 25/081; B60Y 2200/41; B60H 1/00328; B60H 1/00342
See application file for complete search history.

(56) References Cited

U.S. PATENT DOCUMENTS 5,564,513 A * 10/1996 Wible .................. F02M 35/161
180/68.3
9,523,182 B2 * 12/2016 Yabe ..................... E02F 9/0883
(Continued)

FOREIGN PATENT DOCUMENTS

CN 103649423 A * 3/2014 ............ E02F 3/3411
EP 2594463 A1 * 5/2013 ............... B60H 1/28
(Continued)

OTHER PUBLICATIONS

EP-2594463-A1 English Translation (Year: 2013).*
(Continued)

*Primary Examiner* — Michael T. Walsh
(74) *Attorney, Agent, or Firm* — Harness, Dickey & Pierce, P.L.C.

(57) ABSTRACT

A structure for preventing intrusion of rainwater into an engine room includes: an air intake cover that is fixed to an engine cover having an inclined portion where a height gradually lowers from a cabin side to a rear door side; a first rainwater gutter that is disposed below an air intake opening portion of the air intake cover and extends horizontally in a vehicle width direction; a second rainwater gutter that is disposed below the first rainwater gutter, and receives rainwater that flows out from an end portion of the first rainwater gutter in the vehicle width direction and allows the rainwater to flow toward a rear door side; and a third rainwater gutter that is disposed on an inner side of an upper edge of the rear door, receives rainwater that flows out from the second rainwater gutter and discharges rainwater to the outside of an engine room.

8 Claims, 9 Drawing Sheets

(51) Int. Cl.
  *E02F 9/08*    (2006.01)
  *E02F 3/34*     (2006.01)

(56)        References Cited

U.S. PATENT DOCUMENTS

| 11,155,142 | B2 * | 10/2021 | Kaltsounis | ........... | F02M 35/088 |
|---|---|---|---|---|---|
| 2012/0211293 | A1 * | 8/2012 | Leanza | ................ | F02M 35/161 |
| | | | | | 55/385.3 |
| 2014/0238767 | A1 | 8/2014 | Numa | | |
| 2016/0068058 | A1 * | 3/2016 | Kamimae | .............. | B60K 11/06 |
| | | | | | 180/68.1 |
| 2022/0315124 | A1 * | 10/2022 | Mogi | ................... | B62D 25/081 |
| 2024/0068749 | A1 * | 2/2024 | Singh | ..................... | G21C 19/07 |

FOREIGN PATENT DOCUMENTS

| JP | 2002021565 | A | * | 1/2002 | ............. | B62D 25/10 |
|---|---|---|---|---|---|---|
| WO | 2014-128911 | A1 | | 8/2014 | | |
| WO | 2015-079764 | A1 | | 6/2015 | | |

OTHER PUBLICATIONS

JP-2002021565-A English Translation (Year: 2002).*
CN-103649423-A English Translation (Year: 2014).*
Extended European Search Report issued in corresponding application EP 24172311.3 dated Nov. 13, 2024 (8 pages).

* cited by examiner

LEFT → FRONT
REAR → RIGHT

UP

LEFT ← → RIGHT

DOWN

LEFT ← → RIGHT

STRUCTURE FOR PREVENTING INTRUSION OF RAINWATER INTO ENGINE ROOM AND WORKING VEHICLE

CROSS REFERENCE TO RELATED APPLICATIONS

This application claims priority to Japanese Patent Application No. 2023-133028, filed on Aug. 17, 2023, which is expressly incorporated herein by reference in its entirety.

TECHNICAL FIELD

The present invention relates to a structure for preventing intrusion of rainwater into an engine room and a working vehicle therefor.

BACKGROUND ART

As a working vehicle, for example, there has been well-known a crawler-type skid stair loader, a hydraulic shovel (also referred to a power shovel, an excavator, a backhoe or the like) and the like. Such a working vehicle includes a condenser cooling mechanism. The condenser cooling mechanism makes an outside air to which a heat exchange has been already applied flow into an engine room. In the working vehicle, the cooling mechanism is disposed inside a lower portion of the engine cover or inside an outside air intake port. A cooling mechanism on an engine cover side has a structure where outside air is taken into from an air intake cover that is mounted on an engine cover and has an air intake opening portion. However, there is a case where rainwater intrudes into the engine room together with the outside air from the air intake opening portion. In this case, there is a concern that an engine and devices attached to the engine suffer from a drawback due to the intruded rainwater. In view of the above, the working vehicle adopts a rainwater intrusion preventing structure that prevents the intrusion of rainwater entering from an air intake cover into the engine room.

As one example of the rainwater intrusion preventing structure that a working vehicle includes, there has been known a working vehicle where a water discharge mechanism is disposed below a first ventilation portion provided to the engine cover. The water discharge mechanism is constituted of: a receiving pan member that receives rainwater which intrudes from the first air intake portion; and a water guiding member that is disposed below the receiving pan member and guides rainwater stored on the receiving pan member to the outside. The receiving pan member is a tray-shaped member that is constituted of: a bottom plate having a through hole; and a side plate extending upward from an outer peripheral portion of the bottom plate. The water guiding member is disposed below the through hole formed in a corner portion of the bottom plate of the receiving pan member. The water guiding member discharges rainwater received by the receiving pan member from a discharge port disposed between the bottom plate of the water guiding member and a partition wall that defines the engine room and the cooling chamber by portioning. Outside air for cooling is taken in mainly from the air intake portion disposed above a cooling device (for example, see WO 2014/128911 A1).

As another example of the rainwater intrusion preventing mechanism that the working vehicle includes, there has been known a rainwater intrusion preventing mechanism where a ventilation cover unit having a water discharge mechanism is disposed on an upper side cover portion that forms an engine cover. The ventilation cover unit is disposed on the upper cover portion that forms the engine cover. The upper cover portion is arranged in an inclined manner with respect to a vertical direction at an oblique upper side of the engine. The ventilation cover unit is arranged along the inclination of the upper cover portion, and is formed as an integral container having an inner space by an outer ventilation cover portion and an inner ventilation cover portion. The outer ventilation cover portion includes an outer ventilation hole. The inner ventilation cover portion is disposed inside the outer ventilation cover portion, and includes: a rainwater gutter portion that receives rainwater intruded from the outer ventilation hole; and an inner ventilation hole that is disposed on a side above the rainwater gutter portion, and separates outside air and rainwater that intrude from the outside ventilation cover portion. A water drain hole is formed in a lower end of the rainwater gutter portion, and rainwater is discharged to the outside from the drain water hole (see WO 2015/079764 A1).

In the rainwater intrusion preventing structure described in WO 2014/128911 A1, the receiving pan member is disposed in an overlapping manner with the first ventilation portion and hence, rainwater that intrudes from the first ventilation portion can be discharged. However, outside air that enters the engine room from the first ventilation portion is interrupted by the receiving pan member. Particularly, in the working vehicle where the cooling device (a condenser or the like) is disposed on an upper portion of the engine, there exists a difficult task to satisfy both of a rainwater intrusion preventing function and a function of increasing an outside air passing area of the condenser for allowing outside air to pass through the condenser for increasing an air conditioner cooling effect.

Further, in the rainwater intrusion preventing structure described in WO 2015/079764 A1, the ventilation cover unit is formed as an integral container having an inner space by an outer ventilation cover portion and an inner ventilation cover portion. Rainwater that intrudes from the outside ventilation hole is received by the rainwater gutter portion disposed on a side below the ventilation cover unit, and rainwater can be discharged to the outside from the water drain hole formed in the lower end of the rainwater gutter portion. This ventilation cover unit adopts the substantially vertical configuration that is inclined with respect to a vertical line where rainwater and outside air are separated from each other between the rainwater gutter portion on a lower portion of the ventilation cover unit and the ventilation portion on an upper portion of the ventilation cover unit. Accordingly, in the same manner as the above-mentioned WO 2014/128911 A1, in the working vehicle where the cooling device (a condenser or the like) is disposed on an upper portion of the engine, there exists a difficult task to satisfy both of a rainwater intrusion preventing function and a function of increasing an outside air passing area of the condenser for allowing outside air to pass through the condenser for increasing an air conditioner cooling effect.

The present invention has been made to overcome such drawbacks in view of the above-mentioned circumstances, and it is an object of the present invention to provide "a structure for preventing intrusion of rainwater into an engine room" capable of enhancing an effect of preventing the intrusion of rainwater into the engine room from an air intake cover and capable of enhancing a cooling function of a condenser, and a working vehicle provided with the structure for preventing intrusion of rainwater into the engine room.

SUMMARY

[1] A structure for preventing intrusion of rainwater into an engine room according to the present invention is characterized by comprising an air intake cover, a first rainwater gutter, second rainwater gutter and a third rainwater gutter.

The air intake cover is disposed on an upper portion of the engine room. The air intake cover is disposed so as to cover an opening portion formed in an engine cover that has an inclined portion where a height of the engine cover gets lowered from a cabin side toward a rear door side. The air intake cover has an air intake opening portion. The air intake cover is fixed to the engine cover along the inclined portion.

The first rainwater gutter has a rainwater receiving portion and an air intake flow path portion. The rainwater receiving portion is disposed below the air intake opening portion, extends horizontally in a vehicle width direction, and receives rainwater that intrudes from the air intake opening portion. The air intake flow path portion intakes outside air that includes the rainwater, separates an outside air component from the rainwater, and allows the outside air component to flow toward the engine room.

The second rainwater gutter has a rainwater flow path portion, an air intake flow path portion and a center opening portion. The rainwater flow path portion is disposed below the first rainwater gutter and extends toward the rear door side from the cabin side along the inclined portion. The rainwater flow path portion receives rainwater flowing out from an end portion of the first rainwater gutter in the vehicle width direction and allows the rainwater to flow toward the rear door side. The air intake flow path portion intakes the outside air that includes the rainwater, separates the outside air component from the rainwater, and allows the outside air component to flow toward the engine room. The center opening portion faces a condenser.

The third rainwater gutter is disposed on an inner side of an upper edge of the rear door and extends in the vehicle width direction. The third rainwater gutter receives rainwater flowed out from the second rainwater gutter and discharges the rainwater to an outside of the engine room.

[2] In the structure for preventing intrusion of rainwater into the engine room according to the aspect of item [1] described above, the air intake cover may be constituted of a bottom surface portion that is opened, an upper surface portion and a side surface portion. The upper surface portion may have a smaller area than the bottom surface portion. The side surface portion may connect the bottom surface portion and the upper surface portion to each other. The air intake cover may have a space portion surrounded by the upper surface portion and the side surface portion.

The air intake opening portion may be formed in the upper surface portion and the side surface portion respectively.

The first rainwater gutter may be disposed in the inside of the space portion.

The rainwater receiving portion may be disposed just below the air intake opening portion formed in the upper surface portion. It is preferable that the rainwater receiving portion has a larger area than at least the air intake opening portion as viewed in a plan view at a position that faces the air intake opening portion.

[3] In the structure for preventing intrusion of rainwater into the engine room according to the aspect of item [1] described above, the first rainwater gutters may be respectively disposed corresponding to a plurality of the air intake opening portions that is compartmentalized in the upper surface portion of the air intake cover. It is preferable that the first rainwater gutters are arranged parallel to each other at a predetermined interval along the inclined portion.

[4] In the structure for preventing intrusion of rainwater into the engine room according to the aspect of item [1] described above, the first rainwater gutter may have a bottom plate portion, a rear-side wall portion and a front side wall portion. The bottom plate portion may be inclined along the inclined portion. The rear-side wall portion may extend from an end of the bottom plate portion on the rear door side and may be connected to the air intake cover. The front side wall portion may extend from an end portion of the bottom plate portion on the cabin side and may be connected to the air intake cover.

The front side wall portion may have a weir portion and the air intake flow path portion. The weir portion may have a height that prevents an estimated amount of rainwater from getting over the weir portion. The air intake flow path portion may be formed between the weir portion and the air intake cover.

It is preferable that an end portion of the first rainwater gutter in the vehicle width direction is opened.

[5] In the structure for preventing intrusion of rainwater into the engine room according to the aspect of item [1] described above, the rainwater flow path portion of the second rainwater gutter may be constituted of a bottom plate portion, an inner side wall portion and an outer side wall portion. The inner side wall portion may extend from a peripheral portion of the center opening portion of the bottom plate portion toward the first rainwater gutter. The outer side wall portion may extend from the inner side wall portion toward the first rainwater gutter with a predetermined flow path width.

A height of the inner side wall portion from the bottom plate portion may be a height that prevents an estimated amount of rainwater from getting over the inner side wall portion. The height of the inner side wall portion from the bottom plate portion may be lower than a height of the outer side wall portion. Thus an air intake flow path portion may be formed between the inner side wall portion and the first rainwater gutter.

The weir plate that traverses the second rainwater gutter in the vehicle width direction and has a L-shaped cross section may be disposed at an end of the second rainwater gutter on a rear door side.

The weir plate may have an opening portion where a longitudinal piece having the L-shaped cross section allows rainwater from the rainwater flow path portion to flow into the third rainwater gutter. It is preferable that a lateral piece of the weir plate intersects in an overlapping manner over the third rainwater gutter.

[6] In the structure for preventing intrusion of rainwater into the engine room according to the aspect of item [5] described above, a distance from an end portion of the first rainwater gutter in the vehicle width direction to the inner side wall portion of the second rainwater gutter may be longer than a distance from the bottom plate portion of the first rainwater gutter to the bottom plate portion of the second rainwater gutter. It is preferable that a height of the inner side wall portion is set to a height that does not become a resistance against outside air that flows through the air intake flow path portion.

[7] In the structure for preventing intrusion of rainwater into the engine room according to the aspect of item [1] described above, the third rainwater gutter may have an L-shaped cross section. The third rainwater gutter may extend over a vehicle width. The third rainwater gutter may be fixed to an inner side of an upper edge of the rear door by a longitudinal piece having the L-shaped cross section. The third rainwater gutter may extend to a position where a lateral piece is capable of intersecting in an overlapping manner with an end portion of the second rainwater gutter on the rear door side.

A seal member may be mounted on a distal end periphery of the lateral piece on the second rainwater gutter side. A rainwater flow path portion may be formed in a region surrounded by the longitudinal piece, the lateral piece and the seal member.

It is preferable that at least one of end portions of the rainwater flow path portion in the vehicle width direction is closed.

[8] A working vehicle may be characterized by including a vehicle body, a pair of left and right traveling devices, a body frame, a working device, a cabin and the structure of preventing intrusion of rainwater into an engine room according to any one of the above-mentioned items [1] to [7]. The pair of left and right traveling devices may have crawlers each of which is respectively disposed below both ends in a vehicle width direction with respect to the vehicle body.

The body frame may have the traveling devices which are mounted thereon.

The cabin may be disposed on a center upper portion of the body frame.

Hereinafter, the outside air component may also be simply referred to as "outside air".

Advantageous Effects of Invention

According to the "structure for preventing intrusion of rainwater into an engine room" of the present invention, to the engine cover that has the inclined portion where a height is gradually lowered toward a rear door side from a cabin side, the air intake cover that is inclined along the inclined portion 21 is fixed. The air intake cover has the air intake opening portion. The first rainwater gutter is disposed below the air intake opening portion, and extends horizontally in the vehicle width direction. The first rainwater gutter receives rainwater that intrudes from the air intake opening portion by the rainwater receiving portion, and allows the rainwater to flow to the second rainwater gutter. Then, the first rainwater gutter separates outside air that intrudes together with the rainwater by the air intake flow path portion, and allows the outside air to flow toward the condenser from the center opening portion.

The second rainwater gutter is disposed below the first rainwater gutter, and extends toward a rear door side from a cabin side along the inclined portion. The second rainwater gutter receives rainwater that flows out from the ends of the respective first rainwater gutter in the vehicle width direction and rainwater that intrudes from the air intake opening portion of the intake cover by the rainwater flow path portion and allows the rainwater to flow toward the third rainwater gutter. Further, the second rainwater gutter separates outside air that intrudes together with rainwater from the air intake cover by the air intake flow path portion, and allows the outside air to flow toward the condenser from the center opening portion.

Further, the third rainwater gutter is disposed on the inner side of the upper edge of the rear door, extends in the vehicle width direction, receives rainwater flowing out from the second rainwater gutter, and discharges the rainwater to the outside from the end of the engine room in the vehicle width direction.

According to "the structure for preventing intrusion of rainwater into an engine room" of the present invention, it is possible to allow rainwater that intrudes from the air intake cover to flow in a dispersed manner by combining the first rainwater gutter, the second rainwater gutter and the third rainwater gutter that differ in the flow path direction of the rainwater from each other, and to discharge the rainwater that intrudes from the air intake cover to the outside of the engine room.

Further, the first rainwater gutter separates outside air that intrudes together with rainwater by the air intake flow path portion, and allows the outside air to flow toward the condenser from the center opening portion of the second rainwater gutter. The second rainwater gutter separates the outside air from rainwater at the air intake flow path portion, and allows the outside air to flow into the engine room from the center opening portion. The space is formed between the first rainwater gutter and the condenser, and above the condenser including the space and the center opening portion, a large space that does not obstruct the flow of the outside air is formed. Accordingly, it is possible to supply a sufficient amount of outside air into the condenser and hence, the outside air can be sufficiently cooled by the condenser.

As has been described above, according to "the structure for preventing intrusion of rainwater into an engine room" (hereinafter also referred to as "the rainwater intrusion preventing structure"), an effect of preventing the intrusion of rainwater into the engine room from the air intake cover can be enhanced and hence, a function of cooling sucked outside air by the condenser can be enhanced.

DETAILED DESCRIPTION

Hereinafter, "a rainwater intrusion preventing structure 40 for preventing intrusion of rainwater into an engine room 20" and a working vehicle 1 according to an embodiment of the present invention are described with reference to FIG. 1 to FIGS. 9A and 9B. In the description made hereinafter, "a rainwater intrusion preventing structure 40 for preventing intrusion of rainwater into the engine room 20" may also be simply described as "rainwater intrusion preventing structure 40". Further, respective drawings described hereinafter are schematic views where scales, an aspect ratio and the like are different from those of the actual rainwater intrusion preventing structure 40.

(Configuration of Working Vehicle 1)

Figure 1:
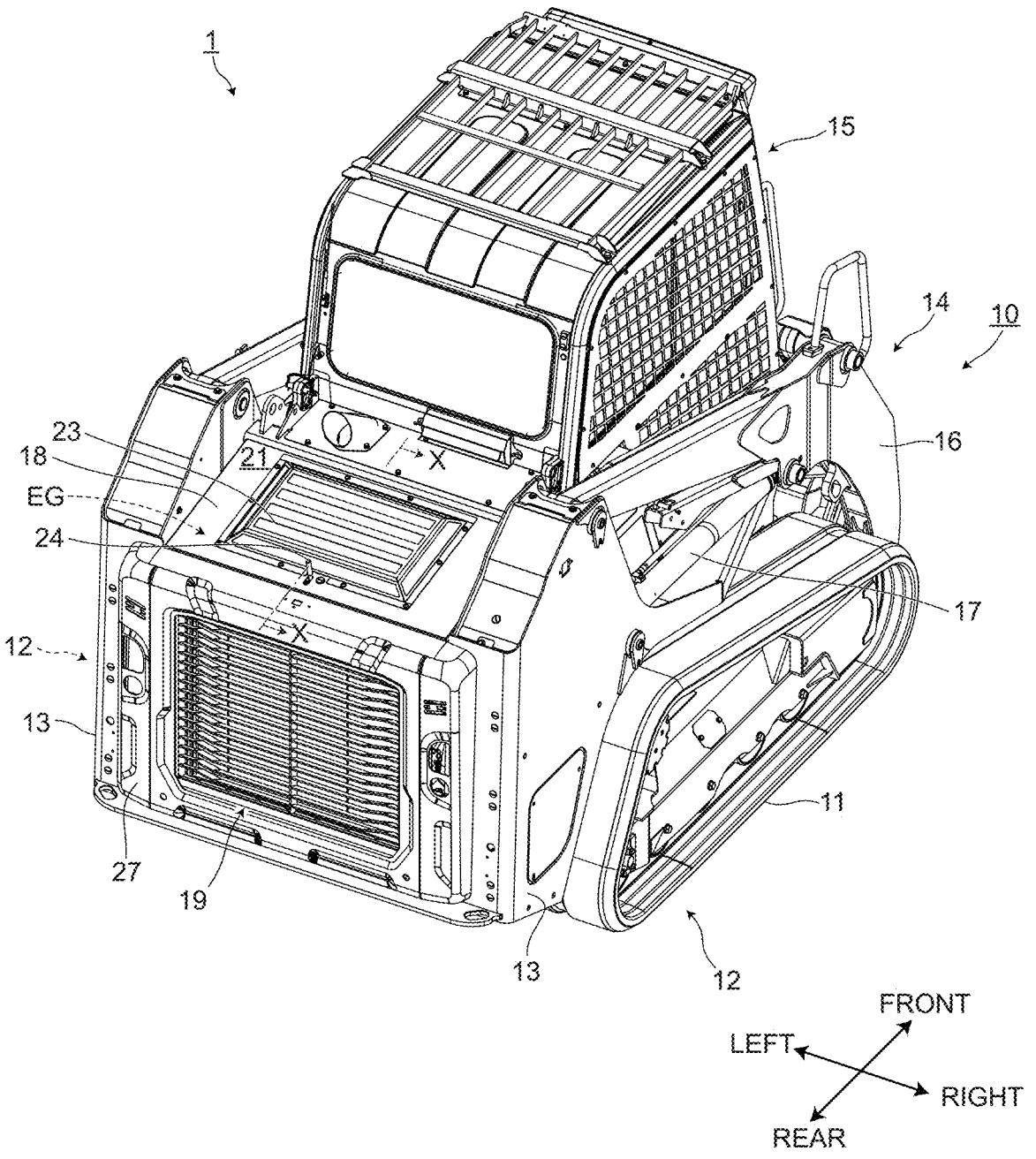
FIG. 1 is a perspective view of an overall configuration of one example of a working vehicle 1 as viewed from a rear side.

FIG. 1 is a perspective view of an overall configuration of one example of a working vehicle 1 as viewed from a rear side. In FIG. 1, the directions of respective parts with respect to a vehicle body 10 are indicated by arrows. That is, with respect to the arrows, an advancing direction of the working vehicle 1 is indicated by the direction "front", a retracting direction of the working vehicle 1 is indicated by the direction "rear", right side toward the advancing direction is indicated by the direction "right", and left side toward the advancing direction is indicated by the direction "left". The working vehicle 1 includes, below both ends in a vehicle width direction with respect to the vehicle body 10, a pair of left and right traveling devices 12, 12 each constituted of a crawler 11. The traveling devices 12, 12 are mounted on a body frame 13. The body frame 13 includes a working device 14 mounted on a front side of the body frame 13. A cabin 15 is disposed on a center upper portion of the body frame 13.

The working device 14 includes a pair of arms 16 disposed such that the arms 16 sandwich left and right sides of the cabin 15, and a pair of left and right hydraulic cylinders 17 that is disposed in an extendable and retractable manner between the body frame 13 and the arm 16. Although not illustrated, the working device 14 further includes a working attachment such as a bucket mounted on front end portions of the arms 16 by way of brackets.

The working vehicle 1 is configured such that an operator is seated in the cabin 15 and operates an operation lever (not illustrated in the drawing) so as to make the working vehicle 1 travel, tilt the arm 16 vertically and tilt the bucket vertically.

Further, in the working vehicle 1, the engine room 20 is a space that is formed by being surrounded by body frames 13 on left and right sides, the engine cover 18 on an upper side, and a rear door 19 on a rear side. An engine EG is disposed in the engine room 20 (see FIG. 2 with respect to the engine room 20 and the engine EG). The engine cover 18 includes an inclined portion 21 having a height that is gradually lowered from a cabin 15 side toward a rear door 19 side. The engine cover 18 includes an opening portion 22 (see FIG. 3) that faces the engine room 20 on a center portion of the engine cover 18. An air intake cover 23 is disposed so as to close the opening portion 22. The detailed configuration of the air intake cover 23 is described later with reference to FIGS. 4A and 4B.

The engine cover 18 is configured such that a rear door 19 side of the engine cover 18 is openable and closable in the vertical direction using hinges (not illustrated in the drawing) on the cabin 15 side. The engine cover 18 is held in a closed state with respect to the body frame 13 by an engine cover lock mechanism 24 during a normal operation, and can be released upward at the time of performing maintenance or the like. On the other hand, the rear door 19 is openable toward a left side in a plan view of a right side using hinge mechanisms 31A, 31B (see FIG. 2) disposed between the body frame 13 on a left side and a rear door frame 27 as a fulcrum. The rear door 19 is held in a closed state by a rear door lock mechanism (not illustrated in the drawing) in a normal state.

Figure 2:
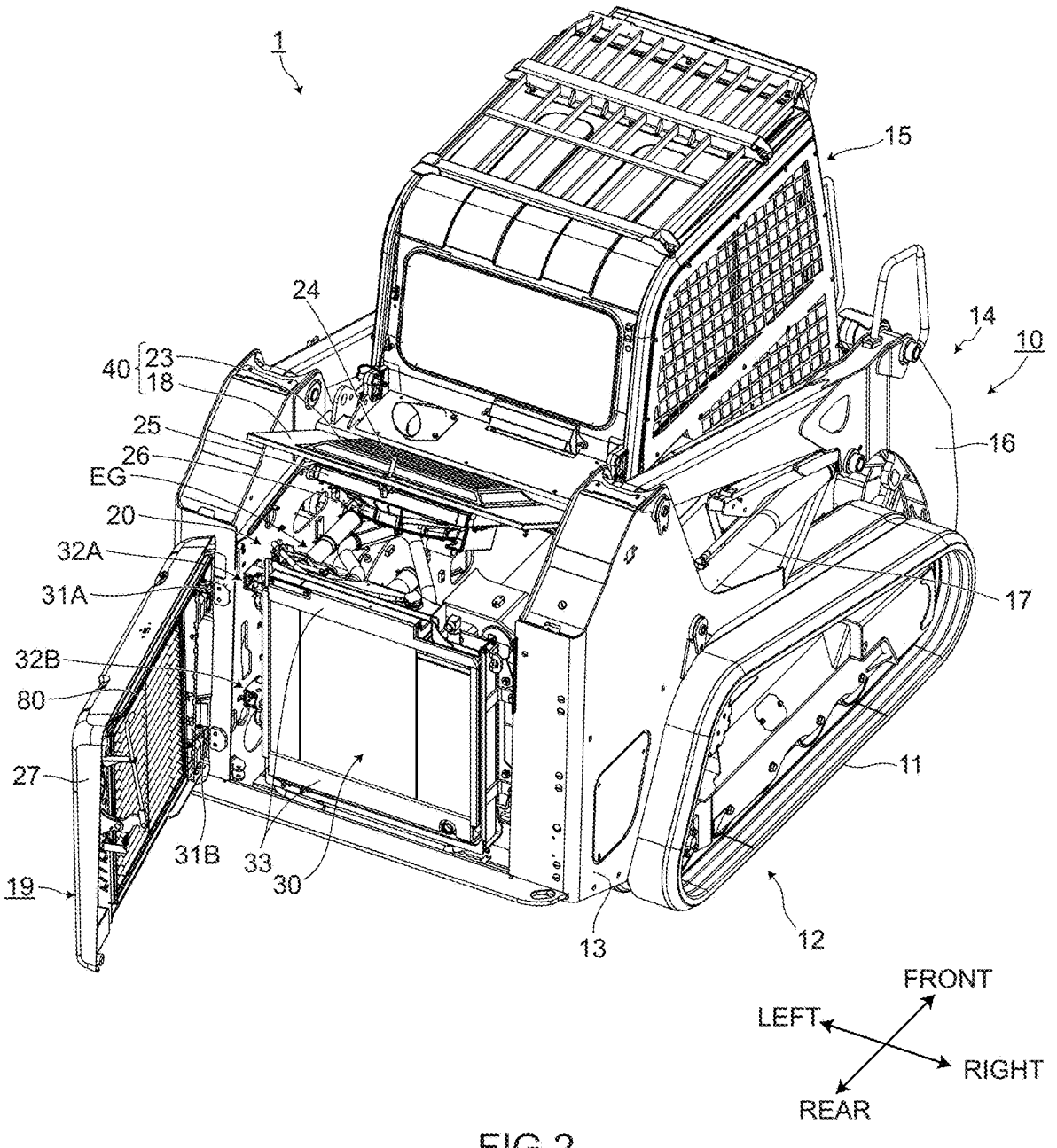
FIG. 2 is a perspective view of the working vehicle illustrating a state where an engine cover 18 and a rear door 19 are opened.

FIG. 2 is a perspective view of the working vehicle illustrating a state where the engine cover 18 and the rear door 19 are opened. In FIG. 2, the configuration of the working vehicle 1 does not differ from the configuration of the working vehicle 1 illustrated in FIG. 1, accordingly constitutional elements described in FIG. 2 are given the same symbols as the constitutional elements in FIG. 1. When the engine cover 18 is brought into an open state by operating an engine cover lock mechanism 24, in the engine cover 18, the air intake cover 23 fixed to an upper side of the engine cover 18, a condenser 25 fixed to a lower side of the engine cover 18 and an air intake fan 26 form an integral body, and an upper side of an engine room 20 is opened toward an upper side. The engine room 20 is a space in which an engine EG is disposed. The condenser 25 performs a heat exchange of intake outside air and the outside air is introduced into the engine room 20. An air intake fan 26 takes in outside air from an air intake opening 36 through the condenser 25. The air intake cover 23 and the engine cover 18 have a first rainwater gutter 50 (see FIGS. 4A and 4B and FIG. 5), a second rainwater gutter 60 (see FIG. 6A) and a third rainwater gutter 80 (see FIG. 8) that are main constitutional elements of the rainwater intrusion preventing structure 40 described later.

As illustrated in FIG. 2, when the rear door 19 is brought into an open state by releasing locking using a rear door locking mechanism (not illustrated in the drawings), a radiator 30 appears. Between the radiator 30 and the engine EG, a fan shroud and a radiator fan (both components not being illustrated in the drawings) are disposed. The radiator 30 is supported in an openable and closable manner in the left-and-right direction by hinge mechanisms 32A, 32B disposed at two positions, that is, an upper position and a lower position, on a left side of the body frame 13 and the radiator frame 33. On an inner upper edge of the rear door 19, a third rainwater gutter 80 that constitutes a main constitutional element of a rainwater intrusion preventing structure 40 described later is mounted.

In the working vehicle 1 described above, the condenser cooling mechanism is disposed above the engine EG or inside an outside air intake port. The condenser cooling mechanism disposed on an upper side of the engine EG takes in outside air for cooling from the air intake opening portion 36 of the air intake cover 23 (see FIG. 3). However, from the air intake opening portion 36, outside air that includes rainwater intrudes into the engine room 20 through the condenser 25. Further, there is a possibility that rainwater that intrudes into the engine room 20 causes a malfunction of the engine EG and equipment attached to the engine EG. In view of the above, the working vehicle 1 includes the rainwater intrusion preventing structure 40 that can prevent the intrusion of rainwater into the engine room 20 from the air intake cover 23 and can take in a sufficient amount of outside air (outside air component) for cooling the condenser 25. Next, the configuration of the rainwater intrusion preventing structure 40 is described.

(Constitution of Rainwater Intrusion Preventing Structure 40)

Figure 3:
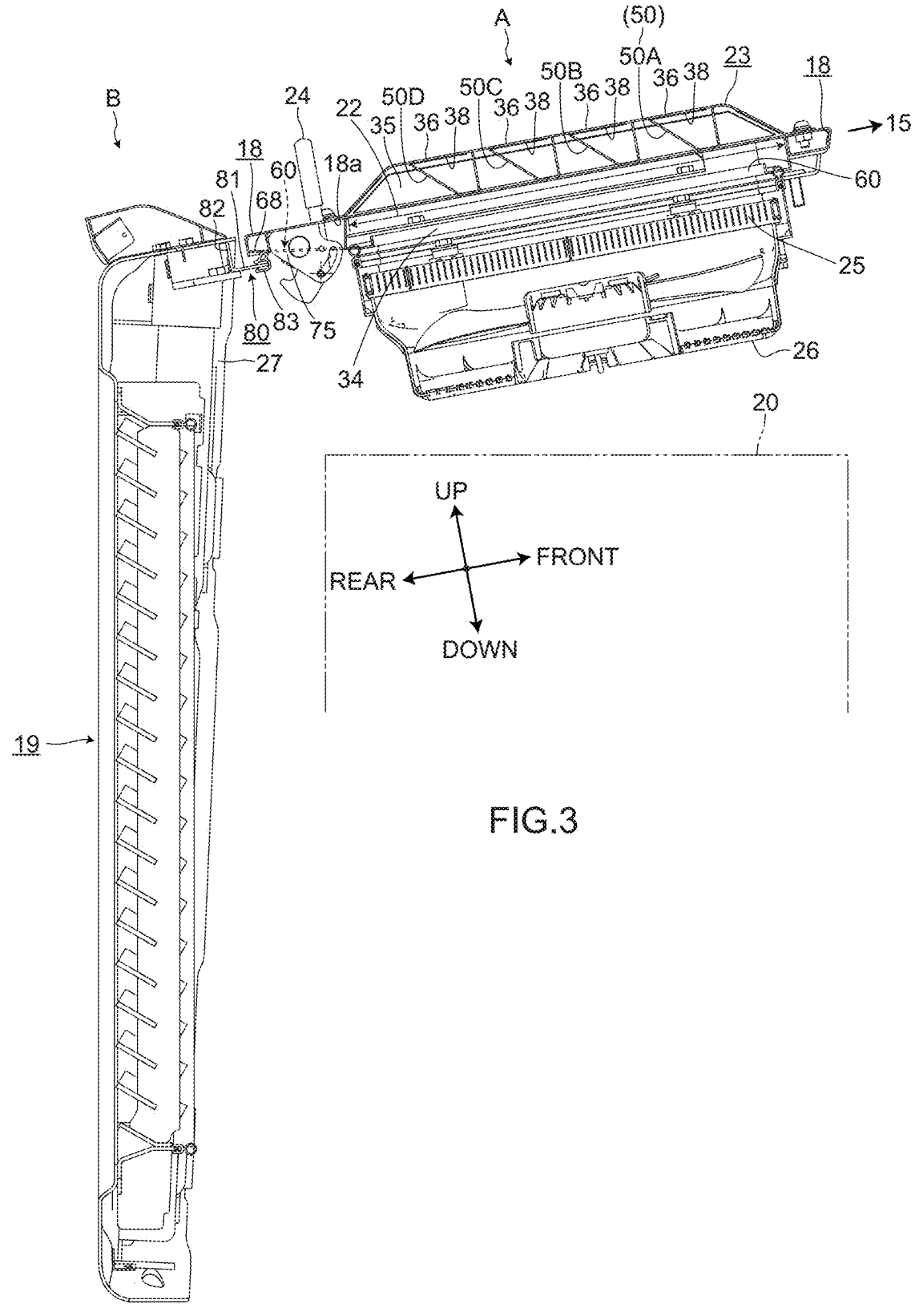
FIG. 3 is a cross-sectional view illustrating an overall structure of the configuration relating to a rainwater intrusion preventing structure 40 taken along a line X-X cutting line in FIG. 1.

FIG. 3 is a cross-sectional view illustrating the overall configuration relating to the rainwater intrusion preventing structure 40 taken along a line X-X in FIG. 1. In FIG. 3, on a right side of the drawing, the configuration is described where the first rainwater gutter 50 and the second rainwater gutter 60 are mounted on the engine cover 18 (indicated by a symbol A). In FIG. 3, on a left side of the drawing, the configuration is described where the third rainwater gutter 80 is mounted on the rear door 19 (indicated by a symbol B).

With respect to the engine cover locking mechanism 24, a well-known mechanism can be used and hence, the description of the engine cover locking mechanism 24 is omitted. The air intake cover 23 is fixed on an upper side of the engine cover 18. In a space portion 35 defined by the air intake cover 23, the first rainwater gutters 50A, 50B, 50C, 50D are disposed at a predetermined interval from a front side (a cabin 15 side). The first rainwater gutters 50A, 50B, 50C, 50D have the same shape. There may be a case where the first rainwater gutters 50A, 50B, 50C, 50D are collectively referred to as "first rainwater gutters 50". The space portion 35 of the air intake cover 23 opens toward the engine room 20.

The opening portion 22 is formed in a center portion of the engine cover 18. The air intake cover 23 is disposed so as to cover the opening portion 22. The air intake cover 23 has air intake opening portions 36. Air intake plates 38 are fixed to an inner side of an upper surface of the air intake cover 23 so as to close the air intake opening portions 36. A large number of through holes 39 (see FIG. 5) are formed in the air intake plate 38. The air intake plate 38 is configured such that the air intake plate 38 does not prevent the suction of outside air while preventing the intrusion of foreign substances such as dusts into the engine room 20. The first rainwater gutter 50 is disposed just below the air intake opening portion 36 that can receive rainwater intruding from the through holes 39. The first rainwater gutter 50 is disposed inside the space portion 35 defined in the air intake cover 23. The configurations of the engine cover 18, the air intake cover 23, and the first rainwater gutter 50 are described in further detail with reference to FIGS. 4A and 4B and FIG. 5.

On a lower side of the air intake cover 23, the second rainwater gutters 60 are disposed with the engine cover 18 sandwiched between the air intake cover 23 and the second rainwater gutters 60. The second rainwater gutters 60 are disposed along lower sides of both end portions of the first rainwater gutter 50 in the vehicle width direction along the inclination of the inclined portion 21 (see FIG. 1) of the air intake cover 23 on lower sides of both end portions of the first rainwater gutter 50 in the vehicle width direction. The second rainwater gutters 60 extend from an end portion on an upper side (a cabin 15 side) to a lower side (a rear door 19 side). The second rainwater gutters 60 collect rainwater that flows out from both end portions of the first rainwater gutters 50 in the vehicle width direction and allow the rainwater to flow toward the rear door 19, and allow the rainwater to the third rainwater gutter 80 mounted on an inner side of an upper edge of the rear door 19. The detailed configuration of the second rainwater gutters 60 is described in further detail with reference to FIGS. 6A and 6B.

The condenser 25 is disposed on a lower side of the second rainwater gutters 60, the air intake fan 26 is disposed on a lower side of the condenser 25. As the method of assembling the air intake cover 23, the first rainwater gutters 50, the second rainwater gutters 60, the condenser 25, the air intake fan 26 and the engine cover 18, a well-known method such as fixing auxiliary members, bolts and nuts, welding or the like can be used and hence, the description of the assembling method is omitted.

The third rainwater gutter 80 is disposed inside an upper edge of the rear door frame 27 that constitutes the rear door 19 over a vehicle width. The third rainwater gutter 80 collects rainwater that flows out from the end portions of the second rainwater gutters 60 on a rear door 19 side, and discharges the rainwater to the outside of the engine room 20. The third rainwater gutter 80 has an L shape in cross section, and is constituted of a lateral piece 81 that extends toward a second rainwater gutter 60 side, and a longitudinal piece 82. A packing 83 that forms a seal member is mounted on an end portion of the lateral piece 81 on a second rainwater gutter 60 side. The third rainwater gutter 80 is configured to be brought into close contact with lower surfaces 75 of the second rainwater gutters 60 by way of a packing 83 when the rear door 19 is closed.

A space portion 35 defined in the air intake cover 23, and a center opening portion 63 (see FIGS. 6A and 6B) that is formed in a center portion of the second rainwater gutter 60 in a widely opened manner communicate with a space 34 formed on an upper side of the condenser 25. Accordingly, it is possible to increase a passing area for cooling air that passes through the condenser 25 without obstructing the flow of outside air that intrudes from the air intake cover 23 by the air intake fan 26.

[Configuration of First Rainwater Gutter 50]

Figures 4A, 4B:
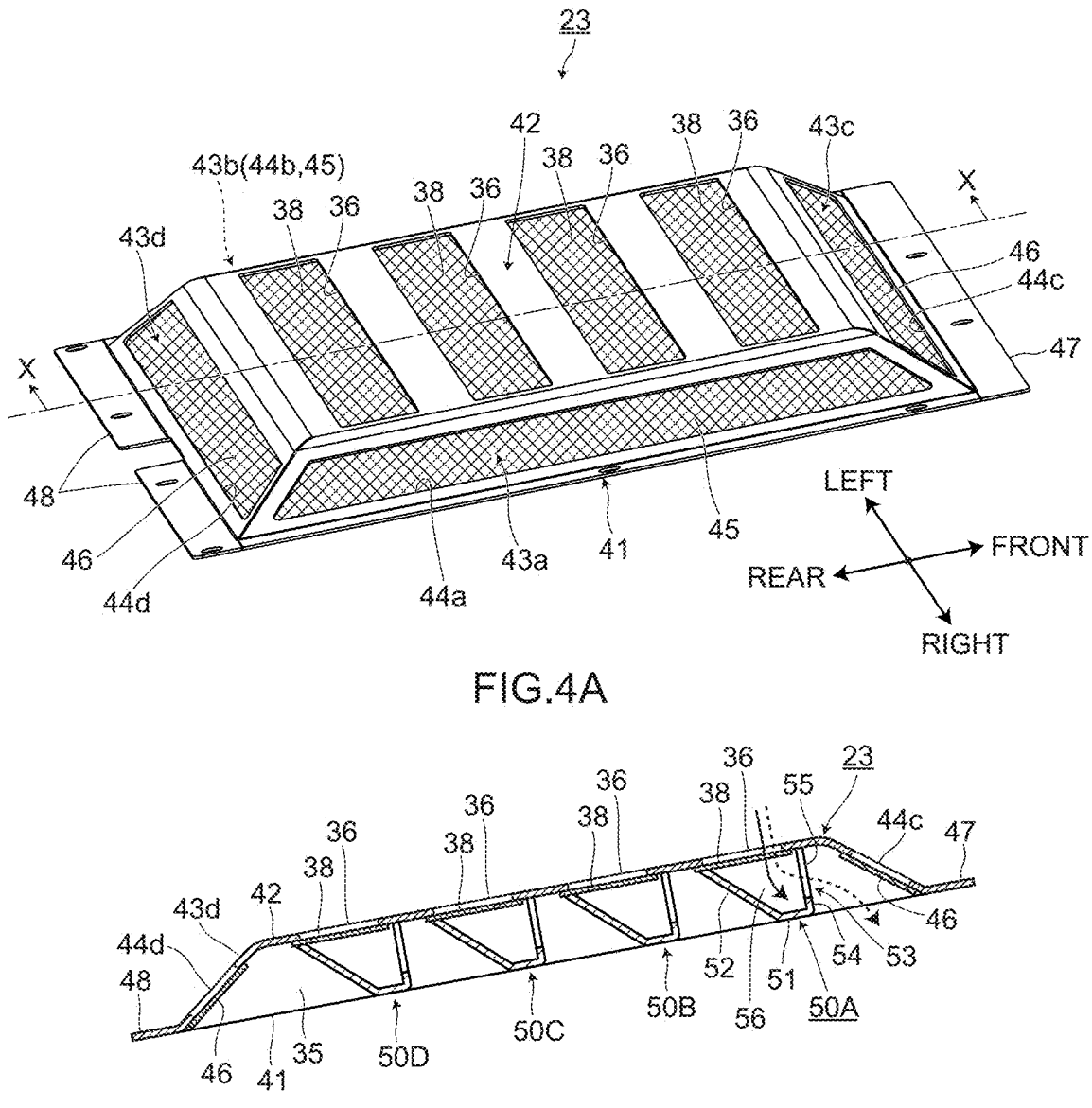
FIGS. 4A and 4B are views illustrating an air intake cover 23 in which first rainwater gutters 50 are incorporated.

FIGS. 4A and 4B are views illustrating the air intake cover 23 in which the first rainwater gutters 50 are incorporated. FIG. 4A is an external perspective appearance view of the air intake cover 23 as viewed from above, and FIG. 4B is a cross-sectional view of the air intake cover 23 taken along a line X-X in FIG. 4A. The air intake cover 23 is constituted of: a bottom surface portion 41 that is open into a surface which faces the opening portion 22 (see FIG. 3) formed in the engine cover 18; an upper surface portion 42 that faces the bottom surface portion 41 and has a smaller area than the bottom surface portion 41; and side surface portions 43a, 43b, 43c, 43d that connect the bottom surface portion 41 and the upper surface portion 42. The space portion 35 (see FIG. 4B) that is surrounded by the upper surface portion 42 and the side surface portions 43a to 43d is formed in the air intake cover 23. That is, the shape of the air intake cover 23 may be referred to as A hollow quadrangular frustum in external appearance. Air intake opening portions 36 are formed in the upper surface portion 42 of the air intake cover 23 at four positions. The air intake plate 38 having the large number of through holes 39 (see FIG. 5) is disposed inside the upper surface portion 42 such that the air intake plates 38 cover the air intake opening portions 36.

Further, air intake opening portions 44a, 44b are formed in the side surface portions 43a, 43b that are disposed in the left-and-right direction respectively. Air intake plates 45 each having a large number of through holes 39 are fixed to the inside of the air intake cover 23 in such a state where the air intake plates 45 cover the air intake opening portions 44a, 44b. On the other hand, air intake opening portions 44c, 44d are formed in the side surface portions 43c, 43d that are arranged in the front-and-rear direction respectively. Air intake plates 46 having a large number of through holes 39 are fixed to the inside of the air intake cover 23 in a state where the air intake plates 46 cover the air intake opening portions 44c, 44d. Fixing portions 47, 48 that are provided for mounting the air intake cover 23 to the engine cover 18 extend toward a front side (a cabin 15 side) and a rear side (a rear door 19 side) respectively. The first rainwater gutters 50A to 50B are disposed in the space portion 35 defined by the air intake cover 23.

As illustrated in FIG. 4B, the first rainwater gutter 50A is constituted of: a bottom plate portion 51 that is inclined along the inclined portion 21 (see FIG. 1); and a rear side wall portion 52 that extends upward from an end of the bottom plate portion 51 on a rear side (the end of the bottom plate portion 51 on a rear door 19 side) and is connected to the air intake cover 23. The first rainwater gutter 50A is further constituted of a front side wall portion 53 that extends upward from an end portion of the bottom plate portion 51 on a front side (the end of the bottom plate portion 51 on a cabin 15 side) and is connected to the air intake cover 23. The front side wall portion 53 has a weir portion 54 of a height that prevents rainwater of an estimated rainwater amount from overflowing the front side wall portion 53. An air intake flow path portion 55 is formed between the weir portion 54 and the air intake cover 23.

A region that is sandwiched by the bottom plate portion 51, the rear side wall portion 52 and the weir portion 54 forms a rainwater receiving portion 56, and the rainwater receiving portion 56 forms a flow path of rainwater that intrudes from the air intake opening portion 36. The rainwater receiving portion 56 is disposed just below the air intake opening portion 36 that is formed in the upper surface portion 42, and a connection side of the rainwater receiving portion 56 that is connected to the air intake cover 23 has a larger area than at least the air intake opening portion 36 as viewed in a plan view. Rainwater (indicated by a solid line in the drawing) that intrudes into the inside from the air intake opening portion 36 is received by the rainwater receiving portion 56 and is fed to the second rainwater gutter 20. On the other hand, outside air that intrudes into the rainwater receiving portion 56 from the air intake opening portion 36 (indicated by a dotted line in the drawing) passes through the air intake flow path portion 55 and flows toward a condenser 25 side (see FIG. 3). The first rainwater gutters 50B to 50D have the same configuration as the first rainwater gutter 50A and hence, the description of the configurations of the first rainwater gutters 50B to 50D is omitted. The first rainwater gutter 50 is configured such that end portions of the first rainwater gutter 50 in the vehicle width direction (the left-and-right direction) are opened so that rainwater received by the rainwater receiving portion 56 can be discharged to the second rainwater gutter 60.

Figure 5:
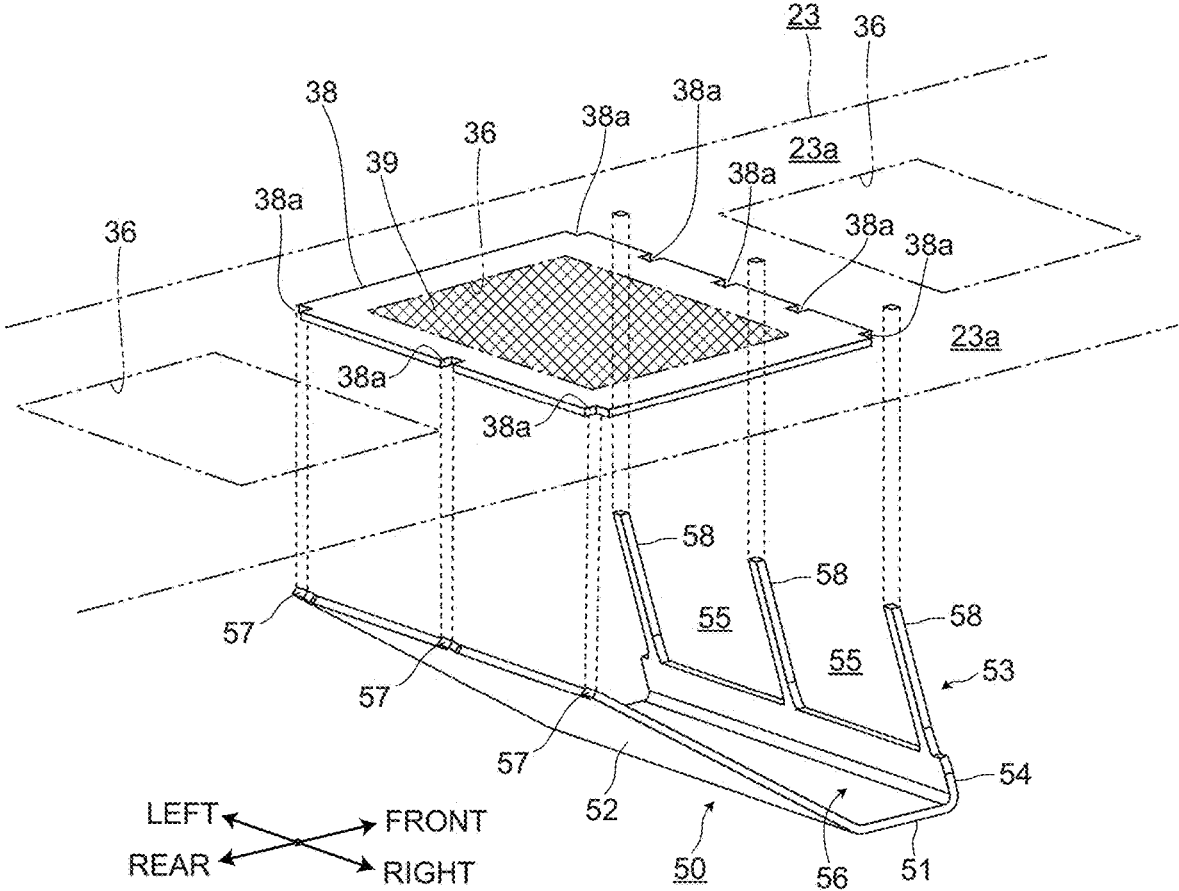
FIG. 5 is an exploded view of an assembly illustrating the first rainwater gutters 50 and air intake plates 38.

FIG. 5 is an exploded view illustrating the configuration of the first rainwater gutter 50 and the air intake plate 38 during assembling of these members. As described previously, the first rainwater gutter 50 is constituted of the bottom plate portion 51, the rear side wall portion 52, and the front side wall portion 53. Protruding portions 57 are formed on an end portion of the rear side wall portion 52 on an air intake cover 23 side at three positions. On the front side wall portion 53, the weir portion 54 having a smaller height than the rear side wall portion 52, and three pillar portions 58 that extend toward an air intake cover 23 side from the weir 54 are formed.

The air intake plate 38 is formed of a rectangular plate-shaped member in which a large number of through holes 39 are formed. Notched portions 38a are formed on side surfaces of the air intake plate 38 on a rear side and a front side. The notched portions 38a formed on a rear side has a shape that allows the notched portion 38a engage with the protruding portion 57 of the first rainwater gutter 50 by fitting engagement.

Next, the assembled structure of the first rainwater gutter 50 is described with reference to FIG. 5. The air intake plate 38 is fixedly mounted on an inner surface 23a of the air intake cover 23 at a periphery of the air intake opening portion 36. The first rainwater gutter 50 is brought into contact with the inner surface 23a of the intake cover 23 while making the protruding portion 57 of the rear side wall portion 52 engage with the notched portion 38a of the air intake plate 38 by fitting engagement. Then, by bringing the pillar portions 58 of the front side wall portion 53 into contact with the inner surface 23a of the air intake cover 23, the first rainwater gutter 50 is connected to the air intake cover 23. In the first rainwater gutter 50 where that is assembled to the air intake cover 23 in this manner, a space defined by the weir portion 54, planes formed between the pillar portions 58, and an inner surface 23a of the air intake cover 23 form the air intake flow path portion 55. Further, a region that is surrounded by the bottom plate portion 51, the rear side wall portion 52 and the weir portion 54 form the rainwater receiving portion 56.

Here, rainwater that intrudes from the air intake opening portion 36 flows out into the second rainwater gutter 60 without getting over the weir portion 54. The outside air that intrudes from the air intake opening portion 36 flows gets over the weir portion 54 and flows in the direction toward the engine room 20 from the air intake flow path portion 55. That is, it may be safe to say that the weir portion 54 separates rainwater and outside air that intrude from the air intake opening portion 56 from each other.

[Configuration of Second Rainwater Gutter 60]

Figure 6A:
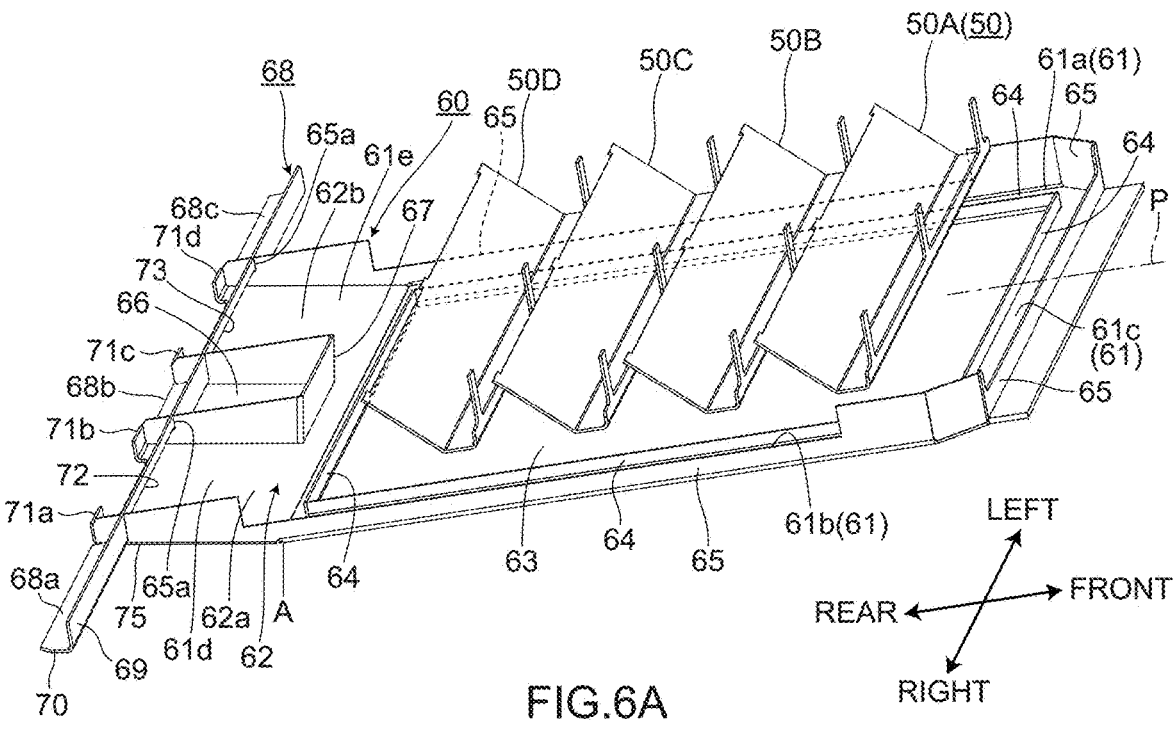
FIGS. 6A and 6B are views illustrating the configuration of a second rainwater gutter 60 and the positional relationship of first rainwater gutters 50A to 50D.
Figure 6B:
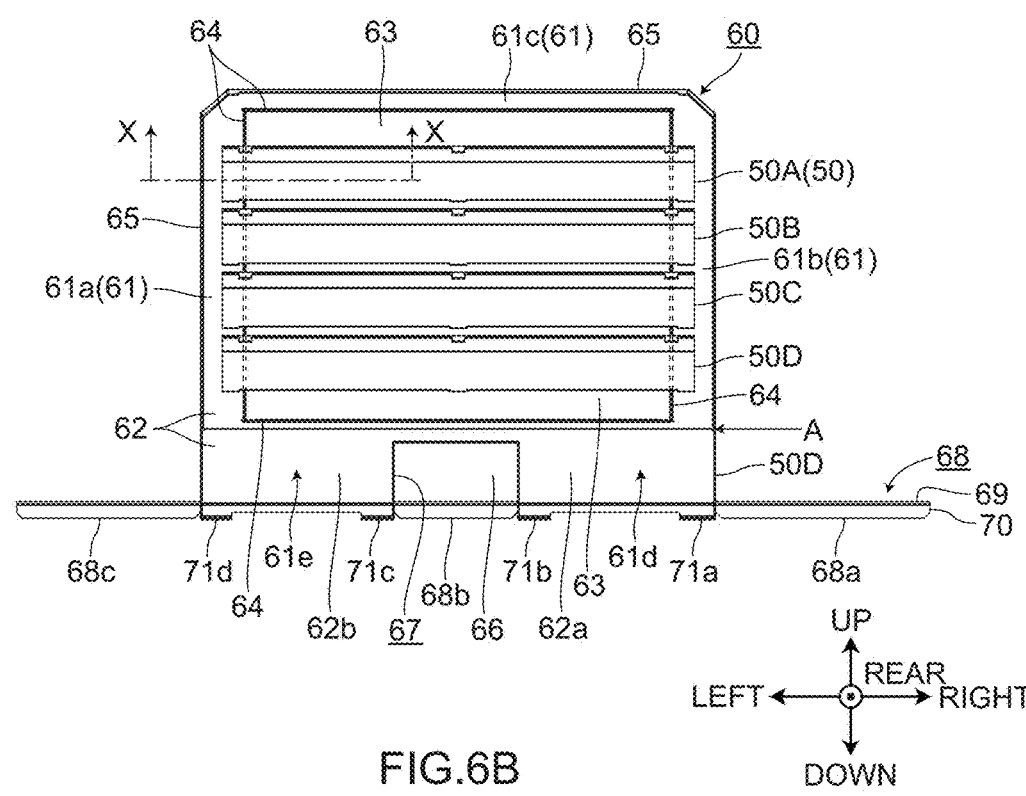

FIGS. 6A and 6B are views illustrating the configuration of the second rainwater gutter 60 and the arrangement relationship between the second rainwater gutter 60 and the first rainwater gutters 50A to 50D. FIG. 6A is a perspective view as viewed from an upper side, and FIG. 6B is a front view as viewed from a rear side in FIG. 6A. The second rainwater gutter 60 is a member that is formed in a tray shape, and is disposed on a lower side of the first rainwater gutters 50A to 50D. The second rainwater gutter 60 is bent in the vertical direction at an intermediate portion thereof in the longitudinal direction. A region disposed in front of a symbol A (a cabin 15 side) is a region where the second rainwater gutter 60 is inclined along the inclined portion 21 of the engine cover 18. A region disposed behind the symbol A (rear door 19 side) is a region that is substantially horizontal.

The second rainwater gutter 60 has a center opening portion 63 that faces the condenser 25 (see FIG. 3). The second rainwater gutter 60 has a rainwater flow path portion 61 that receives rainwater flowing out from both ends of the first rainwater gutter 50 (both end portions in the vehicle width direction) and rainwater intruding into the air intake opening portions 44a to 44d (see FIGS. 4A and 4B) that are disposed at the side surface portions of the air intake cover 23 and makes such rainwater flow toward a rear side (a rear door 19 side). The rainwater flow path portion 61 includes: rainwater flow path portions 61a, 61b that extend in the longitudinal direction at both end portions in the left-and-right direction (vehicle width direction); and a rainwater flow path portion 61c that connects the rainwater flow path portion 61a and the rainwater flow path portion 61b at a front side end portion.

Bottom portions of the rainwater flow path portions 61a, 61b, 61c are connected to each other on a bottom plate portion 62. The rainwater flow path portion 61 is constituted of: the bottom plate portion 62 that connects the entirety of the rainwater flow path portions 61a, 61b, 61c, 61d; an inner side wall portion 64 that extends from a peripheral portion of the center opening portion 63 formed in the bottom wall portion 62 and extends from the bottom plate portion 62 toward a first rainwater gutter 50 side; and an outer side wall portion 65 has a predetermined flow path width from the inner side wall 64 and extends from the bottom plate portion 62. An outer side wall portion 65 does not exist on a rear side (a rear door 19 side). A height from the bottom plate portion 62 of the inner side wall portion 64 is a height that rainwater of an estimated rainwater amount does not get over the inner side wall portion 64, and is lower than a height of the outer portion side portion 64.

The rainwater flow path portions 61a, 61b, 61c are inclined such that the height is gradually lowered toward the rear side (the rear door 19 side). Accordingly, received rainwater flows toward the rear side (the rear door 19 side). At a rear side end portion, the bottom plate portion 62 is divided into a bottom plate portion 62a and a bottom plate portion 62b, and a cutout hole 66 that penetrates in a thickness direction is formed between the bottom plate portion 62a and the bottom plate portion 62b. This cutout portion 66 is a relief hole for preventing the occurrence of a case that an operation of the engine cover lock mechanism 24 is interrupted. A weir frame 67 is disposed around the cutout frame 67. The weir plate 67 is provided for preventing rainwater that flows from the rainwater flow path portions 61a, 61b from flowing into the engine lock mechanism 24.

On an end portion of the second rainwater gutter on a rear side (the vehicle width direction), a weir plate 68 that traverses the second rainwater gutter 60 in the left-and-right direction (the vehicle width direction) is disposed. The weir plate 68 has an L shape, and a longitudinal piece 69 of the L-shaped weir plate 68 is mounted in a slit 65a (see FIG. 6A) formed in the outer wall portion 65. A height of the weir plate 68 from the bottom plate portions 62a, 62b is defined by a depth of the slit 65a. Further, a lateral piece of the L-shaped weir plate 68 is divided into three portions, and is constituted of three protruding portions 68a, 68b, 68c that are disposed at an interval. Further, on distal end portions of the bottom plate portions 62a, 62b on a rear side (a rear door 19 side), protruding portions 71a, 71b, 71c, 71d that each have a bent tip portion are formed.

The protruding portions 71a, 71b are inserted between the protruding portion 68a and the protruding portion 68b of the weir plate 68. The protruding portions 71c, 71d are inserted between the protruding portions 68b and the protruding portions 68c of the weir plate 68. With such a configuration, the protruding portions 71a to 71d suppress the positional displacement of the weir plate 68 in the left-and-right direction (the vehicle width direction). A rainwater flow path portion 61d is formed between the outer wall portion 65 on the right side and the weir frame 67, and the rainwater flow path portion 61c is formed between the outer side portion on a left side and the weir plate 67. The center opening portion 63 is formed in a region surrounded by the rainwater flow path portions 61a to 61c, and has an area compatible to a flat area of the condenser 25.

An opening portion 72 is formed in the weir plate 68 downstream of the rainwater flow path portion 61d, and an opening portion 73 is formed in the weir plate 68 downstream of the rainwater flow path portion 61c (see FIGS. 6A and 6B). The opening portions 72, 73 are formed for allowing rainwater that the rainwater flow path portions 61a, 61b, 61c, 61d have collected to flow into the third rainwater gutter 80. An uppermost surface of the outer wall portion 65, an uppermost surface of the weir frame 67 and an uppermost surface of the weir plate 68 are respectively brought into contact with an upper-side inner surface 18a (see FIG. 3) of the engine cover 18.

Next, the flow of rainwater that passes through the first rainwater gutter 50 and the second rainwater 60 and reaches the third rainwater gutter 80 is described with reference to FIGS. 4A and 4B and FIGS. 6A and 6B. The rainwater flow path portion 61a collects rainwater that flows out from the left side of the first rainwater gutters 50A to 50D and rainwater that intrudes from the air intake opening portion 44b, and allows the rainwater to flow toward the rear side. The rainwater flow path portion 61b collects rainwater that flows out from the right side of the first rainwater gutters

50A to 50D and rainwater that intrudes from the air intake opening portion 44a of the side surface portion 43a, and allows the rainwater to flow toward the rear side. Further, the rainwater flow path portion 61c collects rainwater that intrudes from the air intake opening portion 44c of the side surface portion 43c, and allows the rainwater toward the rainwater flow path portions 61a, 61b. Then, the rainwater flow path portions 61d, 61e collects rainwater that flows from the rainwater flow path portions 61a, 61b and rainwater that intrudes from the air intake opening portion 44d of the side surface portion 43d, and allows the rainwater to flow toward the third rainwater gutter 80.

Figure 7A:
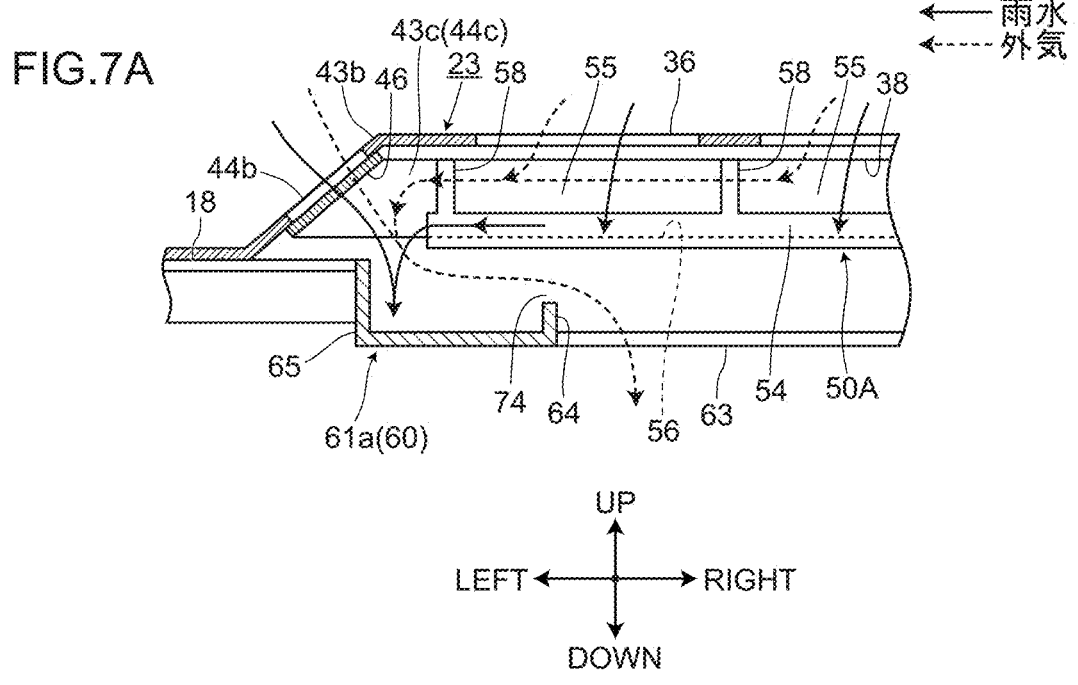
FIGS. 7A and 7B are schematic views illustrating the flow of outside air and the flow of rainwater in the first rainwater gutter 50A and the second rainwater gutter 60.
Figure 7B:
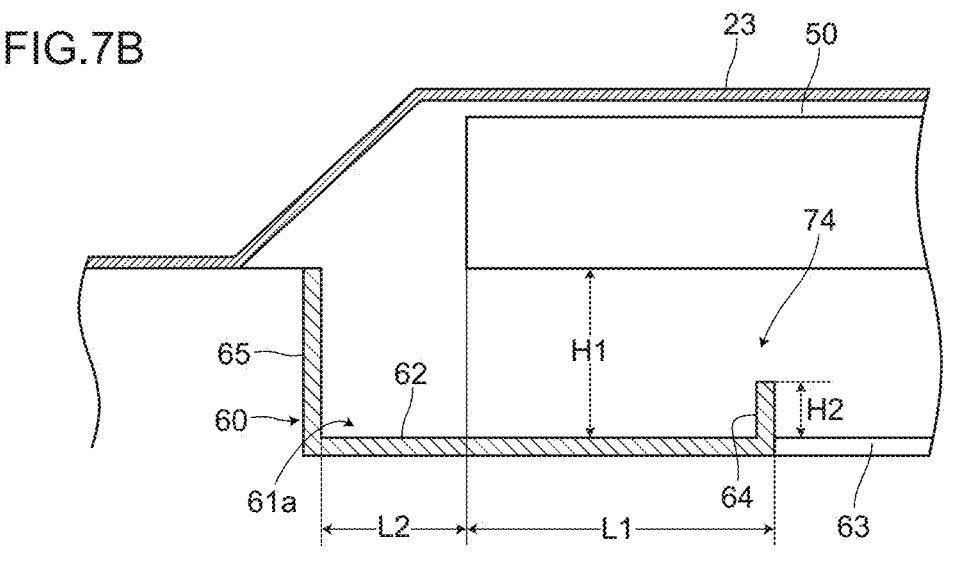
Figure 7B:
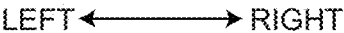

FIGS. 7A and 7B are schematic views illustrating the flow of outside air and the flow of rainwater in the first rainwater gutter 50A and the second rainwater 60. FIG. 7A is a cross-sectional view of the first rainwater gutter 50A and the second rainwater 60 taken along a line X-X in FIG. 6B, and FIG. 7B is an explanatory view illustrating the separation of rainwater and outside air between the second rainwater gutter 60 and the first rainwater gutter 50. In FIG. 7A, the flow of rainwater is expressed by an arrow indicated by a solid line, and the flow of outside air is indicated by an arrow of a dotted line. In FIG. 7A, a left side of the second rainwater gutter is illustrated. However, the first rainwater gutter 50 and the second rainwater gutter 60 are arranged in symmetry with respect to a center line P in the left-and-right direction as viewed in a plan view. Accordingly, the case where the second rainwater gutter is arranged on the right side of the second rainwater gutter 60 can be described by replacing the left side with the right side and hence, the description of such a case is omitted. The first rainwater gutter 50A and the second rainwater 60 are described also with reference to FIGS. 4A and 4B, FIG. 5 and FIGS. 6A and 6B. The respective identical constitutional elements described in FIGS. 7A and 7B are given with the same symbols used in FIGS. 4A and 4B, FIG. 5 and FIGS. 6A and 6B. Rainwater that introduces from the air intake opening portion 36 of the air intake cover 23 passes through the rainwater receiving portion 56 of the first rainwater gutter 50, and flows out to the rainwater flow path portion 61a of the second rainwater gutter 60. Outside air that intrudes from the intake opening portion 36 of the air intake cover 23, passes through the rainwater flow path portion 55 of the first rainwater gutter 50A, gets over the inner side wall portion 64, passes the air intake flow path portion 74, and flows out toward a condenser 23 side from the center opening portion 63 of the second rainwater gutter 60.

Rainwater that intrudes from the air intake opening portion 44b of the side surface portion 43b flows through the rainwater flow path portion 61a of the second rainwater gutter 60. At this point of time, there is no possibility that rainwater gets over the inner side wall portion 64. On the other hand, rainwater that intrudes from the air intake opening portion 44c of the side surface portion 43c passes through the rainwater flow path portion 61c, and flows into the rain water flow path portion 61a and the rain water flow path portion 61b. Further, outside air that intrudes from the air intake opening portion 44b of the side surface portion 43b and the air intake opening portion 44c of the side surface portion 43c passes the rainwater flow path portion 61a and the air intake flow path portion 74 formed in an upper portion of the inner side wall portion 64, and flows toward the condenser 25 side from the center opening portion 63.

The condition that enables the effective separation of intruding rainwater and outside air from each other is described hereinafter with reference to FIG. 7B. In the following description, assume a distance from an end portion of the first rainwater gutter 50 in the vehicle width direction to the inner side wall portion 64 of the second rainwater gutter 60 (that is, a crossing difference between the first rainwater gutter 50 and the second rainwater gutter 60 at an end portion in the vehicle width direction) as L1, a distance from the bottom surface portion 51 of the first rainwater gutter 50 to the bottom plate portion 62 of the second rainwater gutter 60 as H1, and a height of the inner side wall portion 64 as H2. To separate the intruding rainwater and outside air from each other between the first rainwater gutter 50 and the second rainwater gutter 60, it is preferable to set the distance L1 longer than the distance H1. Further, it is preferable to set the height H2 of the inner side wall portion 64 to a height that does not obstruct the flow of outside air that flows the air intake flow pass portion 55 as a resistance. A distance L2 from the outer wall portion 65 of the second rainwater gutter 60 to an end of the first rainwater gutter 50 in the vehicle width direction (a distance of a range where the second rainwater gutter 60 does not intersect in an overlapping manner with the first rainwater gutter 50) is set to a distance that allows the reception of rainwater flowing out from the first rainwater gutter 50 and the rainwater intruding from the air intake opening portion 44*b* (see FIGS. 4A and 4B).

The condition that enables the effective separation of intruding rainwater and outside air from each other is not limited to the above-mentioned condition. However, in the case where the distance L1 becomes small, there is a possibility that some rainwater is sucked into the condenser 25 from the center opening portion 63 together with outside air. On the other hand, in the case where the distance L1 becomes excessively large, there is a possibility that space efficiency is deteriorated or a fluid body resistance generated by a pressure loss. In view of the above, it is desirable to set the height H2 of the inner side wall portion 64 and the distance L1 where the first rainwater gutter 50 and the second rainwater gutter 60 intersect in an overlapping manner with each other to optimum values that enables the separation of rainwater and outside air by taking into account the sizes of the first rainwater gutter 50 and the second rainwater gutter 60, the relative arrangement positions of the first rainwater gutter 50 and the second rainwater gutter 60, an estimated amount of rainwater, a suitable air intake amount of outside air and the like.

(Configuration of Third Rainwater Gutter 80)

As illustrated in FIG. 3, below an end portion of the second rainwater gutter 60 on a rear side (a rear door 19 side), the third rainwater gutter 80 is disposed. The third rainwater gutter 80 is fixed to an inner side of an upper edge of the rear door frame 27 that constitutes the rear door 19. The configuration of the third rainwater gutter 80 is described with reference to FIG. 8 and FIGS. 9A and 9B.

Figure 8:
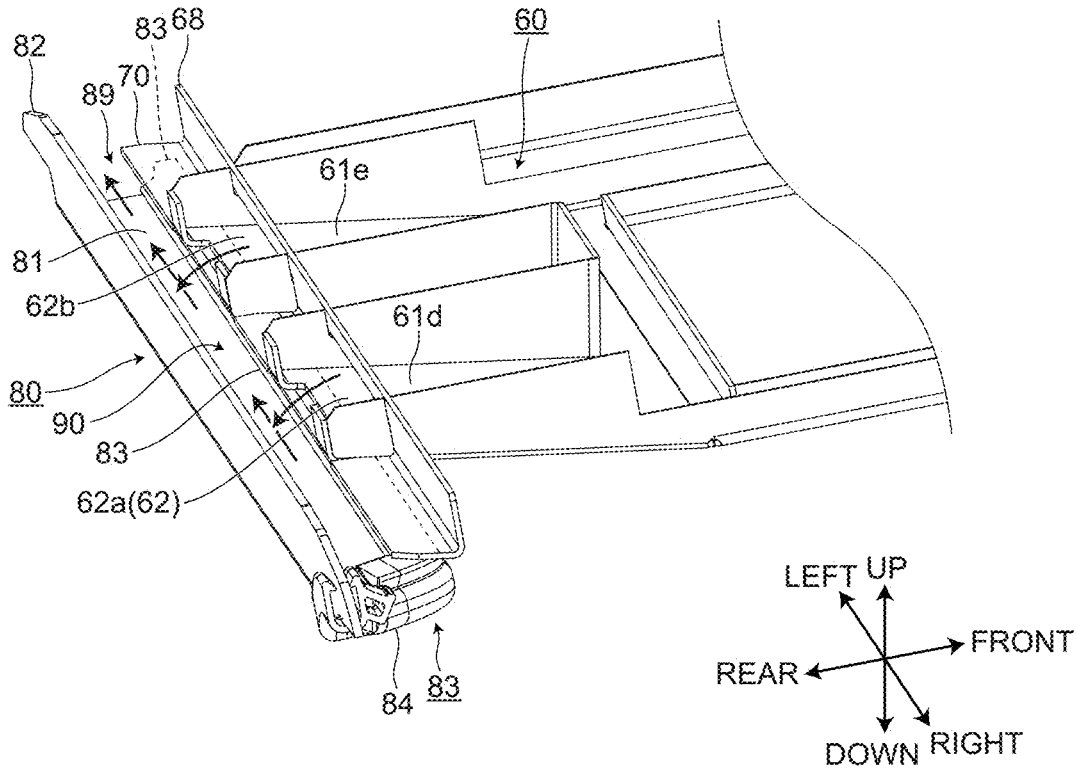
FIG. 8 is a perspective view illustrating the relationship between the second gutter 60 and a third rainwater gutter 80.

FIG. 8 is a perspective view illustrating the relationship between the second rainwater gutter 60 and the third rainwater gutter 80. Parts substantially identical with the parts illustrated in FIGS. 6A and 6B are given the same symbols, and the relationship between the second rainwater gutter 60 and the third rainwater gutter 80 is described also with reference to FIG. 3. Lower-side surfaces (back surfaces) of the bottom plate portions 62*a*, 62*b* of the second rainwater gutter 60, and a lower-side surface (a back surface) of the weir plate 68 are configured to be at the same height and to have the same plane. The third rainwater gutter 80 has an L shape. A lateral piece 81 extends so as to intersect in an overlapping manner with an end portion of the second rainwater gutter 60 on a rear door 19 side, to be more specific, on lower side of end portions of the bottom plate portions 62*a*, 62*b*. A longitudinal piece 82 of the third rainwater gutter 80 is fixed to an inner side of an upper edge of the rear door frame 27 (see FIG. 3). On a periphery of a distal end of the lateral piece 81 on a second rainwater gutter 60 side, a packing 83 that constitutes a seal member is mounted. A rainwater flow path portion 90 is formed in a region surrounded by the longitudinal piece 82, the lateral piece 81 and the packing 83. When the rear door 19 is closed, the third rainwater gutter 80 is brought into close contact with a lower surface 75 (see FIG. 3) of the second rainwater gutter 60 on a rear door 19 side by way of the packing 83. The third rainwater gutter 80 extends substantially over a vehicle width.

The rainwater flow path portion 90 of the third rainwater gutter 80 is formed by being surrounded by the lateral piece 81, the longitudinal piece 82 and the packing 83. The rainwater flow path portion 90 extends over a range where rainwater that flows out from the rainwater flow path portions 61*d*, 61*e* of the second rainwater gutter 60 can be received. The end portion of the third rainwater gutter 80 on a right side is closed by the packing 83 and hence, rainwater is discharged to the outside of the engine room 20 from a rainwater discharge port 89 disposed on a left side of the third rainwater gutter 80. In FIG. 8, the flow of rainwater is expressed by an arrow indicated by a solid line.

A right-side end portion of the packing 83 forms a raised portion 84 that is mounted on both of the lateral piece 81 and the longitudinal piece 82 of the third rainwater gutter 80. The packing 83 is mounted on the lateral piece 81 in a range other than the raised portion 84. Next, the configuration of the third rainwater gutter 80 is described with reference to FIGS. 9A and 9B.

Figures 9A, 9B:
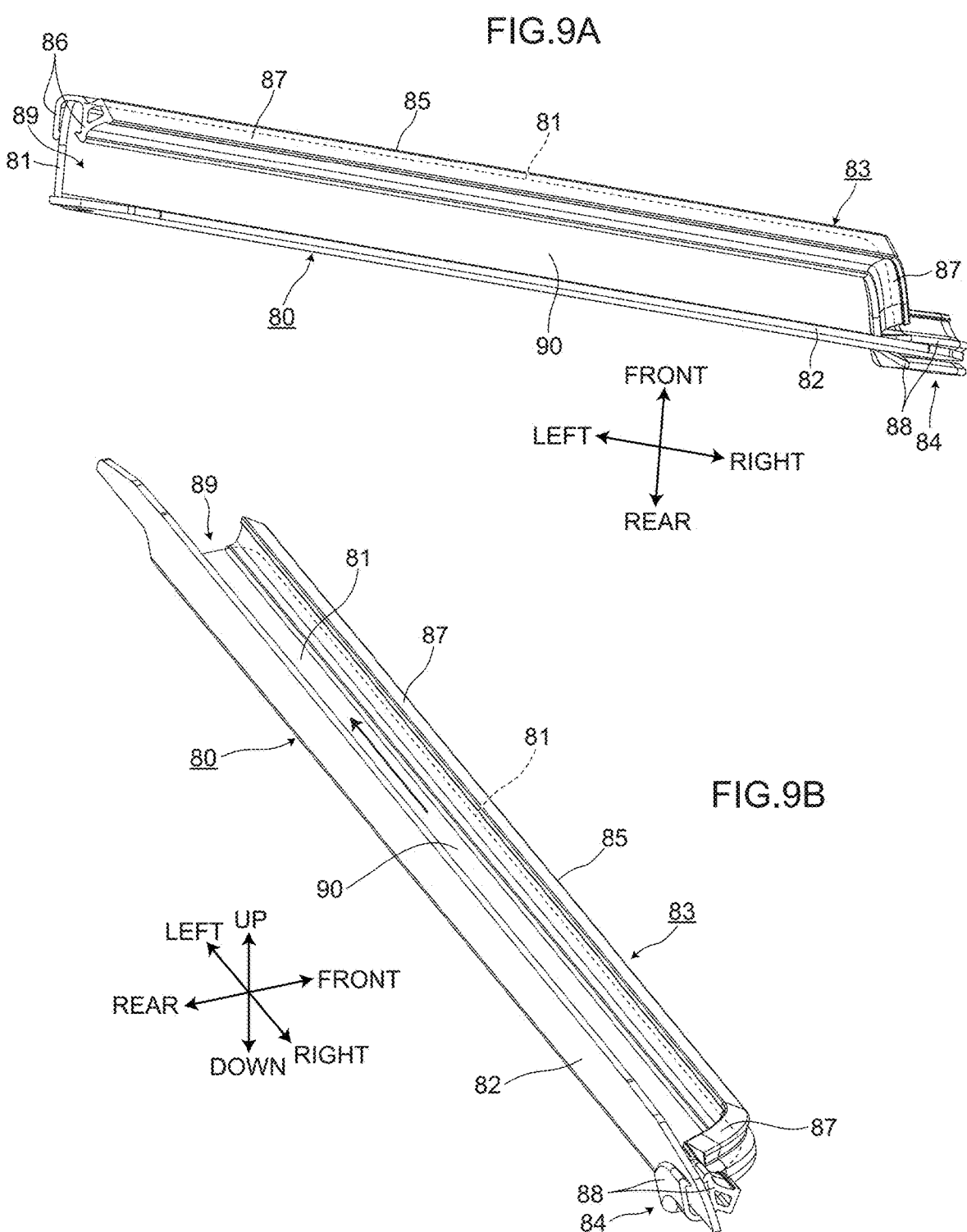
FIGS. 9A and 9B are perspective views illustrating the configuration of the third rainwater gutter 80.

FIGS. 9A and 9B are perspective views illustrating the configuration of the third rainwater gutter 80. FIG. 9A is a perspective view of the third rainwater gutter 80 as viewed from a right side end portion, and FIG. 9B is a perspective view of the third rainwater gutter 80 as viewed from a left side end portion. As illustrated in FIG. 9A and FIG. 9B, the packing 83 is constituted of: a long side portion 85 that is mounted on the lateral piece 81 of the third rainwater gutter 80 over the whole length; and the raised portions 84 that are mounted on both the long side portion 85 and the longitudinal piece 82 disposed on the right side end portion of the third rainwater gutter 80. As illustrated in FIG. 9A, the long side portion 85 is constituted of: a pawl portion 86 on which the packing 83 is mounted in such a manner that the pawl portion 86 sandwiches the lateral piece 81; and a hollow contact surface 87 that protrudes upward from the pawl portion 86 and is brought into contact with a lower surface 75 of the second rainwater gutter 60 (see FIG. 3 and FIGS. 6A and 6B).

As illustrated in FIG. 9A, the raised portion 84 of the packing 83 has the pawl portion 88 that is raised upward from an end portion of the long side portion 85 that extends toward a right side. The pawl portion 88 is configured to be capable of mounting the packing 83 in a state where the packing 83 sandwiches the longitudinal piece 82 of the third rainwater gutter 80. That is, in the third rainwater gutter 80, the packing 83 is mounted over the entirety of the third rainwater gutter 80 in the width direction. Accordingly, the raised portion 84 becomes a stopper for rainwater, and rainwater is discharged only from a rainwater discharge port 89 disposed on a left side. Further, the raised portion 84 functions of preventing the removal of the packing 83 from the lateral piece 81 and the displacement of the packing 83. In FIGS. 9A and 9B, an arrow indicated by a solid line expresses the flow direction of rainwater.

In the rainwater preventing structure 40 as described heretofore, the engine cover 18 has the inclined portion 21 whose height is gradually lowered from the cabin 15 side toward the rear door 19 side, and the air intake cover 23 that is inclined along the inclined portion 21 is fixed. The intake cover 23 has the air intake opening portions 36. The first rainwater gutters 50 are disposed below the air intake opening portions 36, and extend horizontally in the vehicle width direction. The first rainwater gutters 50 receive rainwater that intrudes from the air intake opening portions 36 by the rainwater receiving portions 56, and allows the rainwater to flow into the second rainwater gutter 60. Then, the first rainwater gutters 50 separate outside air that intrudes together with rainwater through e flow pass portions 55, and allows outside air to flow toward the condenser 25 from the center opening portion 63.

The second rainwater gutter 60 is disposed below the first rainwater gutter 50, and extends from the cabin 15 side to the rear door 19 side along the inclined portion 21. The second rainwater gutter 60 receives rainwater that flows out from the end portion of the first rainwater gutter 50 in the vehicle width direction and rainwater that intrudes from the intake cover 23 but is not received by the first rainwater gutter 50, and allows rainwater to flow toward the third rainwater gutter 80. Further, the second rainwater gutter 60 separates outside air that intrudes together with rainwater from the air intake cover 23 by the air intake flow path portion 74 and allows outside air to flow toward the condenser 25 from the center opening portion 63.

The third rainwater gutter 80 is disposed on an inner side of the upper edge of the rear door 19, extends in the vehicle width direction (in the left-and-right direction), receives rainwater flowing out from the second rainwater gutter 60 and discharges rainwater to the outside from the end portion of the engine room 20 in the vehicle width direction.

In the rainwater intrusion preventing structure 40 of the present invention, by combining the first rainwater gutters 50, the second rainwater gutter 60, and the third rainwater gutter 80 that differ from each other in the flow path direction, rainwater is allowed to flow in a dispersed manner. Accordingly, rainwater that intrudes into the engine room 20 from the air intake cover 23 can be discharged to the outside of the engine room 20.

Further, the first rainwater gutter 50 separates outside air that intrudes together with rainwater by the air intake flow path portion 55, sucks outside air by a suction force of the air intake fan 26, and allows outside air to flow toward the condenser 25 from the center opening portion 63 formed in the second rainwater gutter 60. The second rainwater gutter 60 separates outside air by the air intake flow path portion 74, sucks outside air by a suction force of the air intake fan 26, and allows outside air to flow toward the condenser 25 from the center opening portion 63. The space 34 is formed between the first rainwater gutter 50 and the condenser 25, and a wide space including the space 34 and the center opening portion 63 that does not obstruct the flow of outside air is formed above the condenser 25. Accordingly, it is possible to supply a sufficient amount of outside air to the condenser so that cooling of outside air by the condenser 25 can be sufficiently performed.

According to the rainwater intrusion preventing structure 40 described heretofore, an effect of preventing the intrusion of rainwater into the engine room 20 from the air intake cover 23 can be enhanced and, at the same time, a function of sucked cooling outside air by the condenser can be enhanced.

The air intake cover 23 includes the upper surface portion 42 and the side surface portions 43*a* to 43*d*. The rainwater receiving portion 56 of the first rainwater gutter 50 is formed larger than the air intake opening portion 36 and hence, the rainwater receiving portion 56 can receive the entirety of rainwater that intrudes into from the air intake opening portion 36. The first rainwater gutter 50 is disposed in the space portion 35 formed above the engine cover 18. The center opening portion 63 formed in the second rainwater gutter 60 is disposed on a downstream side of the first rainwater gutters 50. Accordingly, a large space can be secured between the first rainwater gutter 50 and the condenser 25 and hence, it is possible to supply a sufficient amount of outside air into the condenser 25 whereby cooling of outside air by the condenser 25 can be appropriately performed.

Further, the rainwater receiving portions 56 of the first rainwater gutters 50 are disposed just below the upper surface portions 45 of the air intake cover 23, and each have an area larger than an area of the air intake opening portion 36 as viewed in a plan view. As a result, the rainwater receiving portions 56 can receive rainwater intruding from the air intake opening portions 36 and allows rainwater to flow into the second rainwater gutter 60.

The air intake cover 23 has the air intake opening portions 36 that are disposed on the upper surface portion thereof at a plurality of positions by zoning. The first rainwater gutters 50 are provided corresponding to the respective air intake opening portions 36. The first rainwater gutter 50 are arranged in order at a predetermined interval along the inclined portion 21 from the first rainwater gutter 50A disposed at the highest position to the first rainwater gutter 50D disposed at the lowest position. The first rainwater gutter 50 can be constituted of a plurality of first rainwater gutters 50 and rainwater can be made to flow in a distributed manner from the first rainwater gutter 50 at one end of the air intake cover 23 to the first rainwater gutter 50 at the other end of the intake cover 23 and hence, an ability of discharging rainwater can be enhanced.

Further, the rainwater receiving portions 56 of the first rainwater gutters 50 each have the bottom plate portion 51 that is inclined along the inclined portion 21. The rainwater receiving portions 56 is constituted of: a rear-side wall portion 52 that extends from the end portion of the bottom plate portion 51 on a rear door 19 side and is connected to the air intake cover 23; and the front-side wall portion 53 that extends from the end portion of the bottom plate portion 51 and on a cabin 15 side and is connected to the air intake cover 23. The front-side wall portion 53 has the weir portion 54 that prevents rainwater from getting over the front-side wall portion 53, and the gap defined between the weir portion 54 and the air intake cover 23 forms the air intake flow path portion 55. With such a configuration, it is possible to allow outside air separated from rainwater to flow toward the center opening portion 63. The first rainwater gutters 50A to 50D each open both end portions thereof in the vehicle width direction and hence, rainwater that intrudes from the air intake cover 23 can be made to flow in a dispersed manner to both ends in the vehicle width direction.

The rainwater flow path portions 61*a*, 61*b*, 61*c*, 61*d* of the second rainwater gutter 60 are each formed with a predetermined flow path width from the inner side wall portion 64 that extends toward the first rainwater gutter 50 from the peripheral portion of the center opening portion 63. Further, the rainwater flow path portions 61*d*, 61*e* are each formed of the inner side wall portion 64 and the weir frame 67. These rainwater flow path portions 61*a* to 61*e* are configured to be capable of receiving the entirety of rainwater that intrudes from the air intake opening portions 36, 44a to 44d of the air intake cover 23, and allow the rainwater into the third rainwater gutter 80. Further, the height of the inner side wall portion 64 is set lower than the height of the outer side wall portion 65. A space defined between the inner side wall portion 64 and the first rainwater gutter 50 forms the air intake flow path portion 74 that separates rainwater and outside air from each other and allows only outside air to flow thus enabling the supply of outside air to the center opening portion 63.

Further, the distance L1 from the end portion of the first rainwater gutter 50 in the vehicle width direction to the inner side wall portion 64 is set longer than the distance H1 from the bottom plate portion 51 of the first rainwater gutter 50 to the bottom plate portion 62 of the second rainwater gutter 60. Further, the height H2 of the inner side wall portion 64 is set to a height such that the inner side wall portion does not become a resistance against outside air that flows through the air intake flow path portion 55. With such a configuration, it is possible to separate rainwater and outside air from each other and hence, it is possible to prevent some of rainwater from flowing into the condenser 25 from the center opening portion 63 through the air intake flow path portion 55. By adopting such a condition, rainwater and outside air can be favorably separated from each other and hence, a cooling effect of the condenser 25 can be enhanced.

The third water gutter 80 is configured such that the third water gutter 80 has an L-shaped cross section, the packing 83 is mounted on the lateral piece 81 of the L-shaped third water gutter 80, and the rainwater flow path portion 90 is formed in the region surrounded by the lateral piece 81, the longitudinal piece 82 and the packing 83. When the rear door 19 is closed, the rainwater flow path portion 90 intersects in an overlapping manner with a lower side of the second rainwater gutter 60 and can receive rainwater flowing out from the second rainwater gutter 60. One end of the rainwater flow path portion 90 in the vehicle width direction is closed by the packing 83 and hence, it is possible to discharge rainwater from the rainwater discharge port 89 formed on the other side of the rainwater flow path portion 90 to the outside of the engine room 20.

The working vehicle 1 is constituted of: the vehicle body 10; the pair of left and right traveling devices 12 that are arranged below both ends with respect to the vehicle body 10; the body frame 13 on which the traveling devices 12 are mounted; the working device 14 that is mounted on the body frame 13; the cabin 15 that is disposed on the center upper portion of the body frame 13; and the rainwater intrusion preventing structure 40 for preventing intrusion of rainwater into the engine room 20.

The working vehicle 1 having such a configuration has the rainwater intrusion preventing structure 40 described above. Accordingly, an effect of preventing the intrusion of rainwater into the engine room 20 from the air intake cover 23 can be enhanced and, at the same time, an effect of cooling intake outside air by the condenser 25 can be enhanced.

The present invention is not limited to the above-mentioned embodiment, and the modifications, improvements and the like of the embodiments within the scope that the objects of the present invention can be achieved are also included in the present invention. For example, in the above-mentioned embodiment, the first rainwater gutters 50A to 50D are arranged horizontally in the vehicle width direction, and rainwater is discharged to the second rainwater gutters 60 from both ends in the vehicle width direction. However, the first rainwater gutters 50A to 50D may be inclined in the longitudinal direction and the rainwater may be allowed to flow to the second gutter 60 from one end portion in the vehicle width direction.

Further, in the above-mentioned embodiment, in the third rainwater gutter 80, the end portion on the right side in the vehicle width direction is closed, and rainwater is discharged from the end portion on the left in the vehicle width direction, that is, from the rainwater discharge port 89. However, the configuration may be adopted where the end portion on the left side is closed, and the rainwater discharge port 89 may be disposed on the right side. Alternatively, the configuration may be adopted where the rainwater discharge port 89 may be disposed on both left and right end portions.

The invention claimed is:

1. A structure for preventing intrusion of rainwater into an engine room, comprising:

an air intake cover that is disposed on an upper portion of the engine room and is disposed so as to cover an opening portion formed in an engine cover that has an inclined portion where a height of the engine cover gets lowered from a cabin side toward a rear door side, the air intake cover having an air intake opening portion, and the air intake cover being fixed to the engine cover along the inclined portion;

a first rainwater gutter having:

a rainwater receiving portion that is disposed below the air intake opening portion, extends horizontally in a vehicle width direction, and receives rainwater that intrudes from the air intake opening portion; and an air intake flow path portion that intakes outside air that includes the rainwater, separates an outside air component from the rainwater, and allows the outside air component to flow toward the engine room;

a second rainwater gutter that has:

a rainwater flow path portion that is disposed below the first rainwater gutter, extends toward the rear door side from the cabin side along the inclined portion, receives rainwater flowing out from an end portion of the first rainwater gutter in the vehicle width direction and allows the rainwater to flow toward the rear door side;

an air intake flow path portion that intakes the outside air that includes the rainwater, separates the outside air component from the rainwater, and allows the outside air component to flow toward the engine room; and a center opening portion that faces a condenser; and a third rainwater gutter that is disposed on an inner side of an upper edge of the rear door, extends in the vehicle width direction, receives rainwater flowed out from the second rainwater gutter, and discharges the rainwater to an outside of the engine room.

2. The structure for preventing intrusion of rainwater into the engine room according to claim 1, wherein the air intake cover is constituted of:

a bottom surface portion that is opened;

an upper surface portion having a smaller area than the bottom surface portion; and a side surface portion that connects the bottom surface portion and the upper surface portion to each other, and has a space portion surrounded by the upper surface portion and the side surface portion, the air intake opening portion is formed in the upper surface portion and the side surface portion respectively, the first rainwater gutter is disposed in the inside of the space portion, and the rainwater receiving portion is disposed just below the air intake opening portion formed in the upper surface portion, and has a larger area than at least the air intake opening portion as viewed in a plan view at a position that faces the air intake opening portion.

3. The structure for preventing intrusion of rainwater into the engine room according to claim 1, wherein the first rainwater gutters are respectively disposed corresponding to a plurality of the air intake opening portions that is compartmentalized in the upper surface portion of the air intake cover, and the first rainwater gutters are arranged parallel to each other at a predetermined interval along the inclined portion.

4. The structure for preventing intrusion of rainwater into the engine room according to claim 1, wherein the first rainwater gutter has:

a bottom plate portion that is inclined along the inclined portion;

a rear-side wall portion that extends from an end portion of the bottom plate portion on the rear door side, and is connected to the air intake cover; and a front side wall portion that extends from an end portion of the bottom plate portion on the cabin side, and is connected to the air intake cover, the front side wall portion has a weir portion having a height that prevents an estimated amount of rainwater from getting over the weir portion, and the air intake flow path portion formed between the weir portion and the air intake cover, and an end portion of the first rainwater gutter in the vehicle width direction is opened.

5. The structure for preventing intrusion of rainwater into the engine room according to claim 1, wherein the rainwater flow path portion of the second rainwater gutter is constituted of:

a bottom plate portion;

an inner side wall portion that extends from a peripheral portion of the center opening portion of the bottom plate portion toward the first rainwater gutter; and an outer side wall portion that extends from the inner side wall portion toward the first rainwater gutter with a predetermined flow path width, a height of the inner side wall portion from the bottom plate portion is a height that prevents an estimated amount of rainwater from getting over the inner side wall portion and is lower than a height of the outer side wall portion thus forming an air intake flow path portion between the inner side wall portion and the first rainwater gutter, a weir plate that traverses the second rainwater gutter in the vehicle width direction and having a L-shaped cross section is disposed at an end of the second rainwater gutter on a rear door side, and the weir plate is formed such that a longitudinal piece of the weir having the L-shaped cross section has an opening portion that allows rainwater from the rainwater flow path portion to flow into the third rainwater gutter, and a lateral piece of the weir intersects in an overlapping manner with the third rainwater gutter.

6. The structure for preventing intrusion of rainwater into the engine room according to claim 5, wherein a distance from an end portion of the first rainwater gutter in the vehicle width direction to the inner side wall portion of the second rainwater gutter is longer than a distance from the bottom plate portion of the first rainwater gutter to the bottom plate portion of the second rainwater gutter, and a height of the inner side wall portion is set to a height that does not become a resistance against outside air that flows through the air intake flow path portion.

7. The structure for preventing intrusion of rainwater into the engine room according to claim 1, wherein the third rainwater gutter has an L-shaped cross section, extends over a vehicle width, and is fixed to an inner side of an upper edge of the rear door by a longitudinal piece of the third rainwater gutter having the L-shaped cross section, and the third rainwater gutter extends to a position where a lateral piece of the third rainwater gutter having the L-shaped cross section is capable of intersecting in an overlapping manner with an end portion of the second rainwater gutter on the rear door side, a seal member is mounted on a distal end periphery of the lateral piece on the second rainwater gutter side, a rainwater flow path portion is formed in a region surrounded by the longitudinal piece, the lateral piece and the seal member, and at least one of end portions of the rainwater flow path portion in the vehicle width direction is closed.

8. A working vehicle comprising:

a vehicle body;

a pair of left and right traveling devices that is disposed below both ends in a vehicle width direction with respect to the vehicle body;

a body frame on which the traveling devices are mounted;

a working device that is mounted on the body frame;

a cabin that is disposed on a center upper portion of the body frame; and the structure of preventing intrusion of rainwater into the engine room according to claim 1.

\* \* \* \* \*